(12) United States Patent
Chen et al.

(10) Patent No.: US 8,587,842 B2
(45) Date of Patent: Nov. 19, 2013

(54) IMAGE PROCESSING APPARATUS AND METHOD FOR CONTROLLING SAME

(75) Inventors: Yi-Che Chen, New Taipei (TW);
Yu-Chu Huang, New Taipei (TW);
Min-Chou Chuang, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 99 days.

(21) Appl. No.: 13/327,767

(22) Filed: Dec. 16, 2011

(65) Prior Publication Data
US 2012/0250117 A1 Oct. 4, 2012

(30) Foreign Application Priority Data
Apr. 1, 2011 (TW) .............................. 100111662 A

(51) Int. Cl.
*H04N 1/04* (2006.01)
(52) U.S. Cl.
USPC ............ 358/474; 358/496; 358/475; 358/448
(58) Field of Classification Search
USPC .......... 358/474, 496, 497, 1.9, 505, 448, 475, 358/509
See application file for complete search history.

(56) References Cited

U.S. PATENT DOCUMENTS

| | | | | |
|---|---|---|---|---|
| 4,641,357 A * | 2/1987 | Satoh | ............................. | 382/317 |
| 5,943,139 A * | 8/1999 | Tang et al. | ..................... | 358/412 |
| 6,148,988 A * | 11/2000 | Lin et al. | ..................... | 198/346.1 |
| 6,597,466 B1 * | 7/2003 | Katayama | ..................... | 358/1.13 |
| 6,608,297 B2 * | 8/2003 | Neukermans et al. | ..... | 250/208.1 |
| 6,954,292 B2 * | 10/2005 | Inoue | ............................. | 358/475 |
| 7,170,659 B2 * | 1/2007 | Jones | ............................. | 358/496 |
| 7,753,365 B2 * | 7/2010 | Oshima | ......................... | 271/152 |
| 7,770,231 B2 * | 8/2010 | Prater et al. | ....................... | 850/6 |
| 7,973,345 B2 * | 7/2011 | Hoffmann et al. | ............ | 257/288 |
| 8,023,716 B2 * | 9/2011 | Davis et al. | .................... | 382/137 |

* cited by examiner

*Primary Examiner* — Negussie Worku
(74) *Attorney, Agent, or Firm* — Altis & Wispro Law Group, Inc.

(57) ABSTRACT

A scanner unit of a multifunction printer (MFP) increases the speed of movement of a scanner head and lowers the scanning resolution during the scanning of a blank area of an image, and decreases the speed of movement of the scanner head and increases the scanning resolution during the scanning of an image area of an image.

18 Claims, 3 Drawing Sheets

IMAGE PROCESSING APPARATUS AND METHOD FOR CONTROLLING SAME

CROSS-REFERENCE TO RELATED APPLICATION

Relevant subject matter is disclosed in co-pending U.S. patent application Ser. No. 13/327,768 entitled "IMAGE PROCESSING APPARATUS AND METHOD FOR CONTROLLING SAME,", filed on the same day as this application.

BACKGROUND

1. Technical Field

The disclosure generally relates to image processing apparatuses and methods for controlling image processing apparatuses.

2. Description of Related Art

Multifunction printers (MFPs) are used widely because MFPs are relatively small in size with low noise and can perform color copying, printing, and scanning at low cost. In recent years, MFPs have advanced in image quality and speed, and thus an A4-sized image can be copied in about one minute with a quality equivalent to a photograph. However, users still demand MFPs with high-speed and high-quality scanning of images. Therefore, there is a need for a technique for scanning an image at a higher speed with no sacrifice of the image quality.

BRIEF DESCRIPTION OF THE DRAWINGS

Many aspects of the embodiments can be better understood with reference to the following drawings. In the drawings, the emphasis is placed upon clearly illustrating the principles of the embodiments.

DETAILED DESCRIPTION

The disclosure is illustrated by way of example and not by way of limitation in the figures of the accompanying drawings. It should be noted that references to "an" or "one" embodiment in this disclosure are not necessarily to the same embodiment, and such references can mean "at least one."

Figure 1:
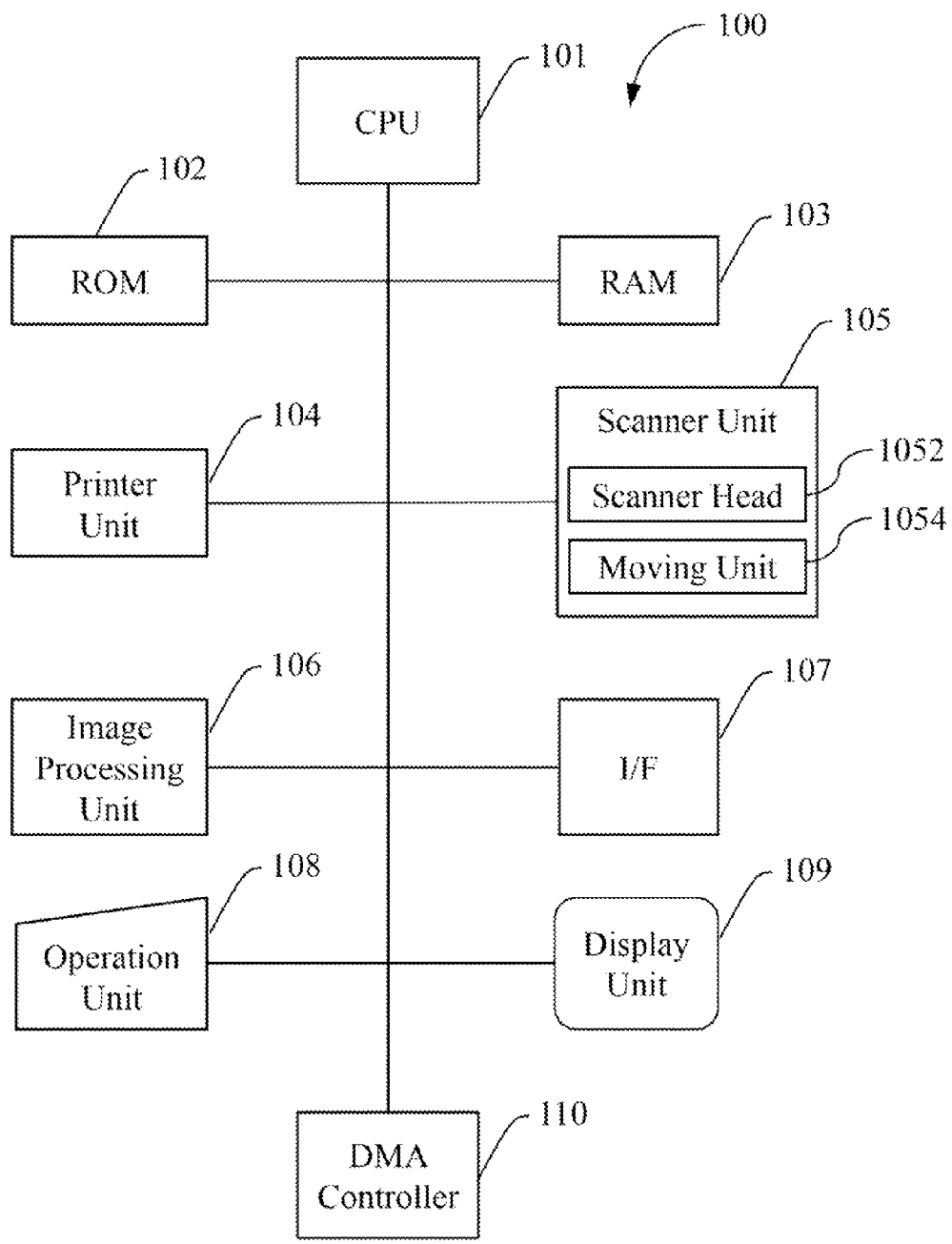
FIG. 1 is a functional block diagram of a multifunction printer (MFP), which is an example of an image processing apparatus according to one embodiment.

FIG. 1 is a functional block diagram of a multifunction printer (MFP) 100, which is an example of an image processing apparatus according to one embodiment. The MFP 100 includes a central processing unit (CPU) 101, a read-only memory (ROM) 102, a random-access memory (RAM) 103, a printer unit 104, a scanner unit 105, an image processing unit 106, an interface (I/F) 107, an operation unit 108, a display unit 109, and a direct memory access (DMA) controller 110.

The CPU 101 is a processor for controlling the MFP 100 overall. The MFP 100 is controlled by running one or more executable software programs (firmware) stored in the ROM 102.

The ROM 102 is non-volatile memory that stores the one or more programs for controlling the MFP 100.

The RAM 103 is volatile memory which is used as a working area when the CPU 101 runs the one or more programs stored in the ROM 102. The RAM 103 is also used as buffer memory for temporarily storing image data received from the scanner unit 105.

The printer unit 104 may print image data on a sheet of paper, an overhead projector (OHP) sheet, and so on.

The scanner unit 105 may scan an image that resides on a sheet of paper, a plastic sheet, a film, and so on (hereinafter, these will be referred to generically as a "medium"), and generate image data. The scanner unit 105 temporarily buffers, in the RAM 103, image data that has been generated by scanning an image.

The scanner unit 105 may include a scanner head 1052, which has a scanning width corresponding to the overall width of the largest readable medium to be used by the MFP 100. For example, the scanning width may be the width of A4-size paper as measured when the sheet of paper is in a portrait orientation (see FIG. 2). A plurality of charge-coupled devices (CCDs) or CMOS image sensors (CISs) may be arranged in the scanner head 1052, in a line along the scanning width direction. Image data is obtained by the CCDs detecting light from the image and converting the detected light into electrical signals. Further, the scanner head 1052 may be mechanically moved along a linear direction in stepwise fashion by a moving unit 1054, such as a motor, with the linear direction being perpendicular to the line of CCDs. The moving unit 1054 is functionally controlled by the CPU 101. The entire image is scanned by a combination of the electrical scanning performed by the CCDs and the mechanical movement of the scanner head 1052. In this description, a direction of electrical scanning performed by the line of CCDs at any one time is called a "main scanning direction," and the direction of mechanical movement of the scanner head 1052 is called a "sub scanning direction."

As described above, the scanner unit 105 may scan an image line-by-line, and may generate color image data. The color image data is image data in which color components including RGB (red, green, blue) components are represented in, for example, 8 bits (0 to 255 gray levels). The number of bits representing each pixel can be freely set within the range of the capability of the CCDs or CISs. The number of bits representing each pixel is called "color depth."

The image processing unit 106 may perform digital image processing such as color correction and filter processing on image data, such image data having first been buffered in the RAM 103 by the scanner unit 105.

The I/F 107 allows the MFP 100 to communicate with various external devices. The external devices may include, for example, a personal computer (PC), or a drive for reading and writing data in a storage medium such as a memory card. The kinds of interfaces used for the I/F 107 may include Universal Serial Bus (USB) and IEEE (Institute of Electrical and Electronics Engineers) 1394.

The operation unit 108 may be operated by a user to provide the MFP 100 with various instructions. A possible instruction includes, for example, a scan instruction for the scanner unit 105 to perform scanning of an image residing on a medium. The instruction to the MFP 100 may be provided from a PC or the like through the I/F 107.

The display unit 109 may notify the user of various information, and be made up of a liquid crystal display (LCD), a light emitting diode (LED) display, and the like. The information provided to the user includes, for example, a state of the MFP 100 (scanning, printing, or idling) and the settings menu of the MFP 100.

The DMA controller 110 is a controller for transferring data between the constituent elements of the MFP 100 through DMA transfer.

Figure 2:
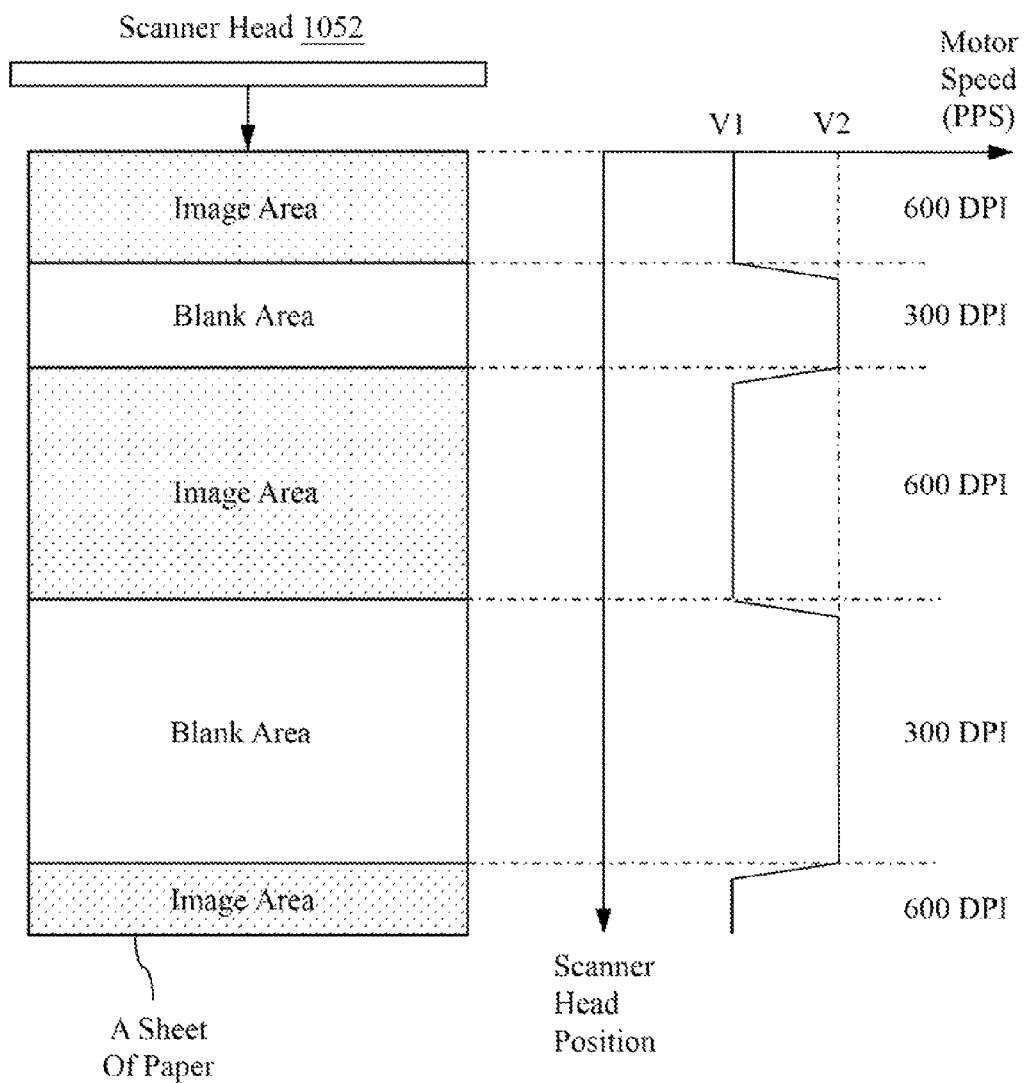
FIG. 2 is a schematic diagram showing processes involved in scanning an image residing on a sheet of paper using the image processing apparatus of FIG. 1.

FIG. 2 is a schematic diagram showing processes involved in scanning an image residing on a sheet of paper using the MFP 100.

When a scan process is initiated, the moving unit 1054 moves the scanner head 1052 along the sub scanning direction (a top-to-bottom direction in FIG. 2) at a first speed (V1) and the scanner head 1052 scans the image with a first scanning resolution, for example, 600 dots per inch (DPI). In FIG. 2, motor speeds are represented by the unit PPS, which is pixels per second.

When the scanner head 1052 is being moved at the first speed and scanning the image with the first scanning resolution, the scanner unit 105 stores the image data of each scanned line in the RAM 103, and the image processing unit 106 determines whether the current position of the scanner head 1052 is in an image area or a blank area. A blank area means that all the pixels in a predetermined number of consecutive scanning lines are white. Strictly speaking, "white" means that all the RGB components of each pixel have the maximum value (for example, 255 for 8-bit color depth) in the generated image data. However, because of visual characteristics and capabilities inherent in the human eye, all the RGB components of each pixel can have a value less than the maximum value and still be perceived as "white" by a person. Thus, each pixel having RGB components exceeding a predetermined threshold value may be regarded as "white" by the image processing unit 106. The predetermined threshold value may for example be 230. The predetermined number of consecutive scanning lines is a threshold minimum number of consecutive white scanning lines, for example, 80 lines.

If all the pixels in the predetermined number of consecutive scanning lines are white, the image processing unit 106 determines that the position of the scanner head 1052 is in a blank area. Otherwise, the image processing unit 106 determines that the position of the scanner head 1052 is in an image area. Put another way, if each scanning line in the predetermined number of consecutive scanning lines is white, the image processing unit 106 determines that the position of the scanner head 1052 is in a blank area. Otherwise, the image processing unit 106 determines that the position of the scanner head 1052 is in an image area.

When the position of the scanner head 1052 reaches a blank area, the moving unit 1054 accelerates the movement of the scanner head 1052 to a second speed (V2) higher than the first speed (V1); and the scanner head 1052 scans the image with a second scanning resolution lower than the first scanning resolution, for example, 300 DPI.

When the position of the scanner head 1052 reaches an image area, the moving unit 1054 decelerates the movement of the scanner head 1052 to the first speed (V1), and the scanner head 1052 scans the image with the first scanning resolution (600 DPI).

As described above, the moving unit 1054 drives the movement of the scanner head 1052 at an increased speed and the scanner head 1052 scans at a lower scanning resolution during the scanning of a blank area, and the moving unit 1054 drives the movement of the scanner head 1052 at a reduced speed and the scanner head 1052 scans at an increased scanning resolution during the scanning of an image area. Thus the total scanning time is shortened, enabling high-speed image scanning with no sacrifice of the image quality.

Figure 3:
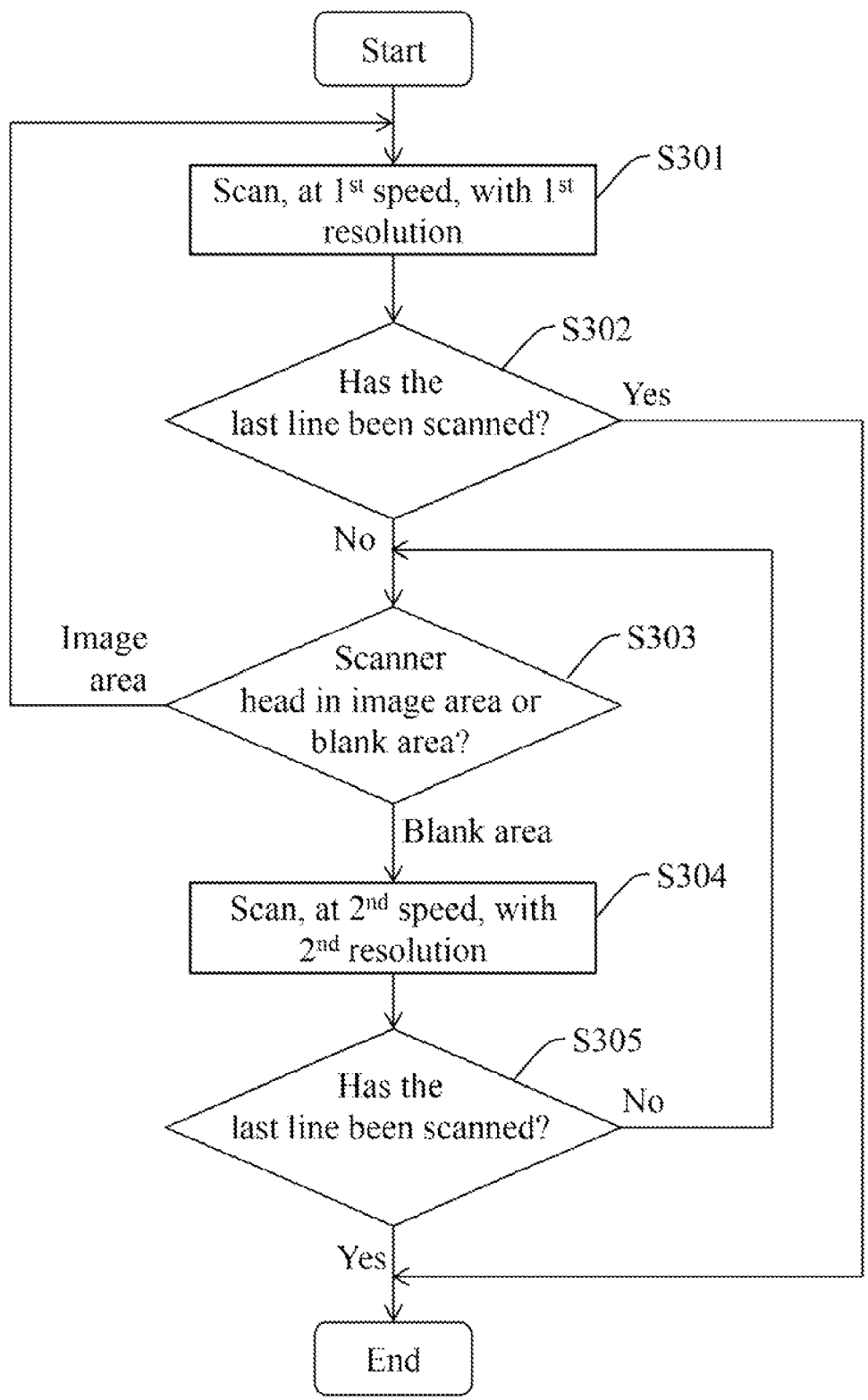
FIG. 3 is a flowchart showing one embodiment of a method for scanning an image according to the embodiment illustrated in FIGS. 1 and 2.

FIG. 3 is a flowchart illustrating one embodiment of a method for scanning an image according to the embodiment illustrated in FIGS. 1 and 2. The method may include the following steps.

In step S301, the moving unit 1054 moves the scanner head 1052 along the sub scanning direction at a first speed (V1) and the scanner head 1052 scans the image residing on a medium with a first scanning resolution, for example, 600 DPI. The scanner unit 105 stores the image data of each scanned line in the RAM 103.

In step S302, the scanner unit 105 determines whether the medium has been fully scanned. If the last scanning line has been scanned, it means that the whole medium has been scanned, and then the procedure ends. Otherwise, the procedure goes to step S303.

In step S303, the image processing unit 106 determines whether the current position of the scanner head 1052 is in an image area or a blank area. If the current position of the scanner head 1052 is in a blank area, the procedure goes to step S304. Otherwise, the procedure goes back to step S301.

In step S304, the moving unit 1054 moves the scanner head 1052 along the sub scanning direction at a second speed (V2) higher than the first speed (V1) and the scanner head 1052 scans the image with a second scanning resolution lower than the first scanning resolution, for example, 300 DPI. The scanner unit 105 stores the image data of each scanned line in the RAM 103.

In step S305, the scanner unit 105 determines whether the medium has been fully scanned. If the last scanning line has been scanned, it means that the whole medium has been scanned, and then the procedure ends. Otherwise, the procedure goes back to step S303.

Although numerous characteristics and advantages have been set forth in the foregoing description of embodiments, together with details of the structures and functions of the embodiments, the disclosure is illustrative only, and changes may be made in detail, especially in the matters of shape, size, and arrangement of parts within the principles of the disclosure to the full extent indicated by the broad general meaning of the terms in which the appended claims are expressed.

In particular, depending on the embodiment, certain steps or methods described may be removed, others may be added, and the sequence of steps may be altered. The description and the claims drawn for or in relation to a method may include some indication in reference to certain steps. However, any indication used is only for illustrative purposes, and not as a suggestion as to a fixed order for the steps.

What is claimed is:

1. An image processing apparatus for scanning an image residing on a medium, the image processing apparatus comprising:
   a scanner unit comprising:
      a scanner head having at least a scanning width, the scanning width corresponding to a width in a first direction of the medium; and
      a moving unit that moves the scanner head in a second direction perpendicular to the first direction;
   a central processing unit that controls the scanner head and the moving unit to perform a scanning operation such that the moving unit moves the scanner head at a first speed; and
   an image processing unit that determines whether each of a predetermined number of consecutive lines scanned under control of the central processing unit is blank or not;
   wherein the central processing unit further controls the scanner head and the moving unit to perform the scanning operation such that the moving unit moves the scanner head at a second speed higher than the first speed, based on a determination by the image processing unit that each of the predetermined number of consecutive lines, scanned under control of the central processing unit, is blank.

2. The image processing apparatus of claim 1, wherein the central processing unit further controls the scanner head and the moving unit to perform the scanning operation such that the image is scanned with a first resolution when the scanner head moves at the first speed.

3. The image processing apparatus of claim 2, wherein the central processing unit further controls the scanner head and the moving unit to perform the scanning operation such that the image is scanned with a second resolution lower than the first resolution when the scanner head moves at the second speed.

4. The image processing apparatus of claim 3, wherein the central processing unit further controls the scanner head and the moving unit to perform the scanning operation such that the moving unit moves the scanner head at the first speed and the image is scanned with the first resolution, based on a determination by the image processing unit that at least one of the predetermined number of consecutive lines, scanned under control of the central processing unit, is not blank.

5. The image processing apparatus of claim 1, wherein the scanner head generates color image data represented by red, green and blue (RGB) components for when the image is a color image.

6. The image processing apparatus of claim 5, wherein the scanner head generates the color image data in units of pixels, each pixel has an RGB component, the image processing unit determines whether each of the predetermined number of consecutive lines, scanned under the control of the central processing unit, is blank or not by determining whether each of the predetermined number of consecutive lines is white or not, and the latter determination is based on values of RGB color image data generated by the scanner head and obtained by the image processing unit.

7. An image processing apparatus for scanning an image residing on a medium, the image processing apparatus comprising:
   a scanner unit comprising:
      a scanner head having at least a scanning width corresponding to a width in a first direction of the medium; and
      a moving unit that moves the scanner head in a second direction perpendicular to the first direction;
   a central processing unit that controls the scanner head and the moving unit to perform a scanning operation such that the image is scanned with a first resolution; and
   an image processing unit that determines whether each of a predetermined number of consecutive lines, scanned under control of the central processing unit, is blank or not;
   wherein the central processing unit further controls the scanner head and the moving unit to perform the scanning operation such that the image is scanned with a second resolution lower than the first resolution, based on a determination by the image processing unit that each of the predetermined number of consecutive lines, scanned under control of the central processing unit, is blank.

8. The image processing apparatus of claim 7, wherein the central processing unit further controls the scanner head and the moving unit to perform the scanning operation such that the moving unit moves the scanner head at a first speed when the scanner head scans with the first resolution.

9. The image processing apparatus of claim 8, wherein the central processing unit further controls the scanner head and the moving unit to perform the scanning operation such that the moving unit moves the scanner head at a second speed higher than the first speed when the scanner head scans with the second resolution.

10. The image processing apparatus of claim 9, wherein the central processing unit further controls the scanner head and the moving unit to perform the scanning operation such that the moving unit moves the scanner head at the first speed and the image is scanned with the first resolution, based on a determination by the image processing unit that at least one of the predetermined number of consecutive lines, scanned under control of the central processing unit is, not blank.

11. The image processing apparatus of claim 7, wherein the scanner head generates color image data represented by red, green, and blue (RGB) components for when the image is a color image.

12. The image processing apparatus of claim 11, wherein the scanner head further generates the color image data in units of pixels, each pixel has an RGB component, the image processing unit determines whether each of the predetermined number of consecutive lines, scanned under the control of the central processing unit, is blank or not by determining whether each of the predetermined number of consecutive lines is white or not, and the latter determination is based on values of RGB color image data generated by the scanner head and obtained by the image processing unit.

13. A control method for controlling an image processing apparatus to scan an image residing on a medium, the image processing apparatus comprising a scanner head having a scanning width corresponding to a width in a first direction of the medium, and a moving unit that moves the scanner head in a second direction perpendicular to the first direction, the method comprising:
   controlling, by a central processing unit of the image processing apparatus, the scanner head and the moving unit to perform a scanning operation such that the moving unit moves the scanner head at a first speed;
   determining, by an image processing unit of the image processing apparatus, whether each of a predetermined number of consecutive lines, scanned under control of the central processing unit, is blank or not; and
   controlling, by the central processing unit, the scanner head and the moving unit to perform the scanning operation such that the moving unit moves the scanner head at a second speed higher than the first speed, based on a determination by the image processing unit that each of the predetermined number of consecutive lines, scanned under control of the central processing unit, is blank.

14. The control method of claim 13, further comprising controlling, by the central processing unit, the scanner head and the moving unit to perform the scanning operation such that the scanner head scans the image with a first resolution when the scanner head moves at the first speed.

15. The control method of claim 14, further comprising controlling, by the central processing unit, the scanner head and the moving unit to perform the scanning operation such that the scanner head scans the image with a second resolution lower than the first resolution when the scanner head moves at the second speed.

16. The control method of claim 15, further comprising controlling, by the central processing unit, the scanner head and the moving unit to perform the scanning operation such that the moving unit moves the scanner head at the first speed and the image is scanned with the first resolution, based on a determination by the image processing unit that at least one of the predetermined number of consecutive lines, scanned under control of the central processing unit, is not blank.

17. The control method of claim 13, further comprising controlling, by the central processing unit, the scanner head to generate color image data represented by red, green and blue (RGB) components when the image is a color image.

18. The control method of claim 17, wherein determining whether each of the predetermined number of consecutive lines, scanned under the control of the central processing unit, is blank or not is accomplished by determining whether each of the predetermined number of consecutive lines is white or not based on values of the RGB color image data representing pixels of the color image.

* * * * *